United States Patent
Menzio

(10) Patent No.: US 6,685,608 B2
(45) Date of Patent: Feb. 3, 2004

(54) DEVICE FOR LOADING AND UNLOADING TOOLS INTO/FROM THE TOOL MAGAZINE OF A MACHINE-TOOL OR THE LIKE

(75) Inventor: Danilo Menzio, Grugliasco (IT)

(73) Assignee: Comau SpA, Grugliasco (IT)

( * ) Notice: Subject to any disclaimer, the term of this patent is extended or adjusted under 35 U.S.C. 154(b) by 0 days.

(21) Appl. No.: 10/152,810

(22) Filed: May 23, 2002

(65) Prior Publication Data

US 2002/0177512 A1 Nov. 28, 2002

(30) Foreign Application Priority Data

May 23, 2001 (IT) ...................................... TO2001A0484

(51) Int. Cl.[7] .............................................. B23Q 3/157
(52) U.S. Cl. .............................. 483/3; 483/58; 483/61; 483/51
(58) Field of Search ................................ 483/3, 39, 61, 483/58, 37, 64, 69, 67, 14, 25, 60, 51; 414/273

(56) References Cited

U.S. PATENT DOCUMENTS 4,563,120 A * 1/1986 Josserand .................... 414/273
4,837,918 A * 6/1989 Holy et al. ..................... 483/25
4,943,199 A * 7/1990 Hillen ............................ 483/61
5,281,194 A * 1/1994 Schneider ..................... 483/14
6,077,206 A * 6/2000 Azema ............................ 483/3

FOREIGN PATENT DOCUMENTS

| JP | 58-120441 | * 7/1983 | .................. 483/37 |
| JP | 58-186544 | * 10/1983 | .................. 483/67 |
| JP | 5-245552 | * 9/1993 | .................. 483/60 |

* cited by examiner

Primary Examiner—A. L. Wellington
Assistant Examiner—Erica E Cadugan
(74) Attorney, Agent, or Firm—Sughrue Mion, PLLC

(57) ABSTRACT

A device for loading and unloading a tool into/from the tool magazine of a machine-tool or the like comprises a door, which separates the area of the tool magazine from an external protected area, and a tool-bearing slide, which can be displaced between a backed-off position outside the door and an advanced position inside the door and close to the tool magazine. The slide is connected to the door by a mechanical transmission in such a way that a movement of advance of the slide causes a simultaneous movement of opening of the door, and a movement of backing off of the slide causes a simultaneous movement of closing of the door.

9 Claims, 4 Drawing Sheets

DEVICE FOR LOADING AND UNLOADING TOOLS INTO/FROM THE TOOL MAGAZINE OF A MACHINE-TOOL OR THE LIKE

BACKGROUND OF THE INVENTION

The present invention relates to any type of machine-tool, machining station or centre or the like equipped with a tool magazine, in which a machining head is able to be brought up to a tool magazine for carrying out an automatic tool change in the course of a machining cycle. In machines of the type referred to above, the tool magazine, which is, for instance, built in the form of a rotary wheel carrying along its periphery a plurality of tool-bearing seats, is periodically supplied with new tools as replacements for tools that have previously been used, for example, on account of failure or wear, or also following upon the need to change the type of machining operation to be carried out. According to traditional techniques, the operation of replacing one or more tools in the corresponding positions in the tool magazine is performed manually. However, this operation is frequently somewhat inconvenient, on account of the limited spaces available around the magazine and also entails safety problems for the operator. There is, moreover, the problem of installing a new tool in a correct angular position in the magazine, this constituting a further difficulty in carrying out the tool-change operation.

SUMMARY OF THE INVENTION

The purpose of the present invention is to overcome the aforesaid drawbacks by enabling loading of a new tool into the tool magazine or unloading of a tool from the magazine with extremely simple, easy and fast operations and with total safety of the operator.

With a view to achieving the above purpose, the subject of the invention is a device for loading and unloading tools into/from the tool magazine of a machine-tool or the like, characterized in that it comprises:

- a protection wall, which separates the tool magazine from an external protected area;
- a door provided on said protection wall for access to the tool magazine;
- a tool-bearing slide, having a tool-bearing support designed to receive a tool to be loaded into the magazine or to be unloaded from the magazine, said slide being slidably mounted on a supporting structure outside the protection wall between an advanced position, in which the tool-bearing support is in a position corresponding to the magazine for loading or unloading of a tool, and a backed-off position, in which the tool-bearing support is in the protected area outside the protection wall for loading or unloading of a tool,
- in which said door is connected by a mechanical transmission to said slide in such a way that a movement of the slide from its backed-off position to its advanced position, and vice versa, produces a simultaneous movement of the access door from its closed position to its open position, and vice versa.

Thanks to the device according to the invention, the operator always remains at a distance from the area of the tool magazine, thus guaranteeing his complete safety. At the same time, the operation of loading and unloading a tool into/from the tool magazine is extremely easy and rapid. In the case where it is necessary to load a new tool into the magazine, the operator simply has to position the new tool on the tool-bearing support of the slide of the device. The tool is able to control (manually, in the case of the preferred embodiment, which will be described in what follows) an advance of the slide from its backed-off position to its advanced position. Following upon this movement of advance, the access door to the tool magazine opens automatically, and the tool-bearing support reaches a position corresponding to the position of the tool magazine, in which the new tool is to be loaded. The actual operation of loading and unloading can be carried out in any known way. For instance, according to a technique in itself known, each position of the tool magazine can be equipped with an elastic device for picking up the tool, so that, when the slide reaches its advanced position, the tool carried by it engages, in snap fashion, the pick-up device in the desired position of the magazine, after which a backing-off of the slide causes disengagement of the tool from the tool-bearing support of the slide itself, which in turn can be equipped with a device for uncoupleable connection of any type. When the slide backs off, the door closes again, thus guaranteeing separation of the areas of the tool magazine from the external protected area. Likewise, should it be necessary to carry out unloading of a tool from the magazine, the slide is brought into its advanced position, with the tool-bearing support of the slide initially empty, until snap-like engagement of the tool to be unloaded from the magazine into the gripping device carried by the slide is obtained. Following upon an activation of a pick-up device carried by the slide, the next backing-off of the slide causes disengagement of the tool from the magazine and its conveyance outside the magazine-access door, which simultaneously re-closes upon the backing-off movement of the slide.

According to a preferred embodiment, the aforesaid door has two panels, which can slide away from and up to one another in a direction transverse to the direction of movement of the slide. Once again in the case of this embodiment, the two panels are connected in an articulated way to two arms, set outside the protection wall, which have their opposite ends articulated to said supporting structure so as to be mobile between a first closed position and a second open position corresponding to the closed and open conditions of the door, said slide having engagement members co-operating with guide means arranged on the aforesaid two arms in such a way that a displacement of the slide between the backed-off position and the advanced position causes a corresponding displacement of the panels of the door between the closed condition and the open condition. Once again in the case of the preferred embodiment, the aforesaid guide means consist of a slit made in each of the two arms, within which a pin carried by the slide is engaged in a slidable way. Preferably, the slide includes a cross member carrying, at its ends, the aforesaid pins engaged in the guide slits of the two articulated arms.

According to a further characteristic, the tool-bearing support is provided with sensor means for detecting the presence of the tool, and there are further provided sensors designed to detect the operative position of the slide. The signals of said sensor means are sent to an electronic control unit which guarantees proper operation of the device, in synchronization with the operating cycle of the machine-tool, the operative position of the tool magazine being taken into account.

BRIEF DESCRIPTION OF THE DRAWINGS

Further characteristics and advantages of the present invention will emerge from the ensuing description, with reference to the attached drawings, which are provided purely by way of non-limiting example and in which.

DETAILED DESCRIPTION OF THE INVENTION

Figure 2:
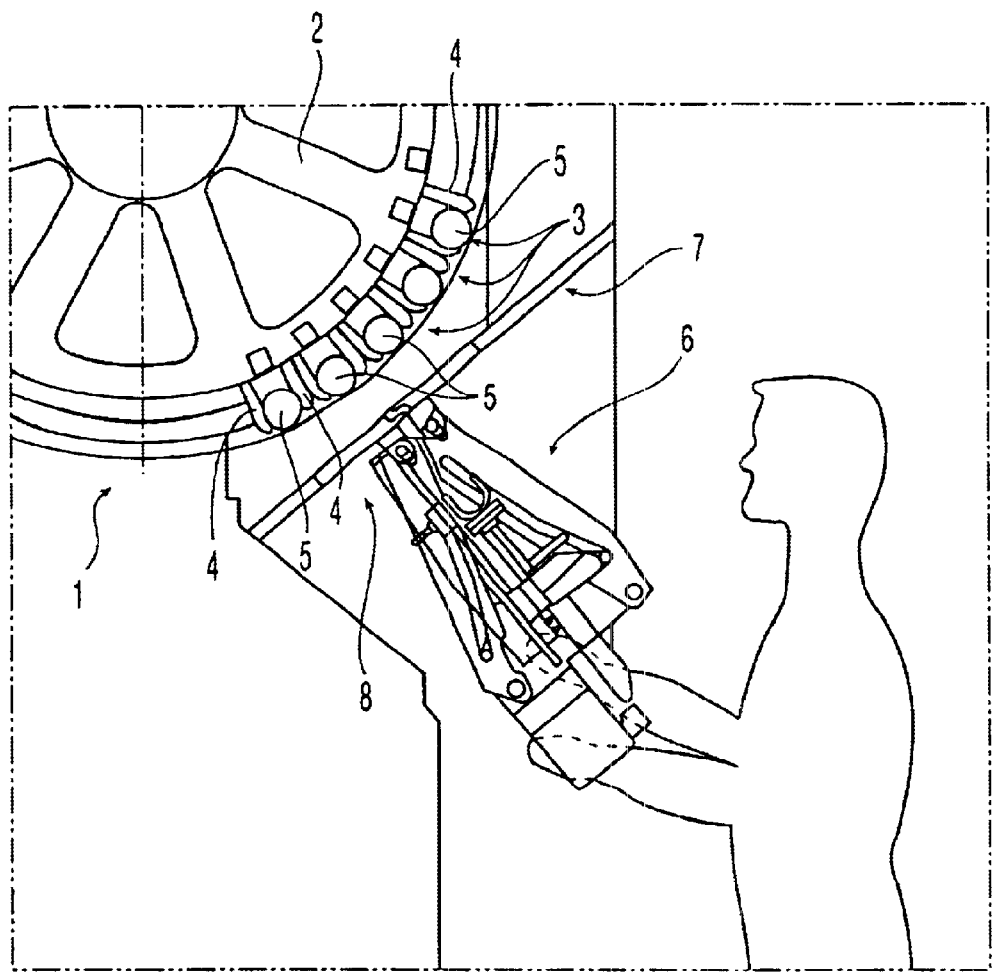
FIG. 2 is a schematic side view of the device illustrated in FIG. 1.

In FIG. 2, the reference number 1 designates, as a whole, the tool magazine of a machine-tool, consisting of a rotary wheel 2 carrying on its periphery a plurality of seats 3 provided with elastic jaws 4 for picking-up supporting respective tools 5, which are illustrated only schematically in the drawings. The machine-tool to which the magazine 1 is associated is not illustrated in the drawings and may be of any known type whatsoever. Normally, the machine-tool comprises a machining head which is mobile along three axes; the said head may thus be carried into the vicinity of the magazine 1 for automatic replacement of a tool. In turn, the broken or worn tools which are unloaded from the machining head into the magazine 1 can be replaced by the operator with new tools, or else with tools designed for carrying out other, different, operations. For this purpose, the operator uses a device 6 built in conformance with the present invention.

Figure 1:
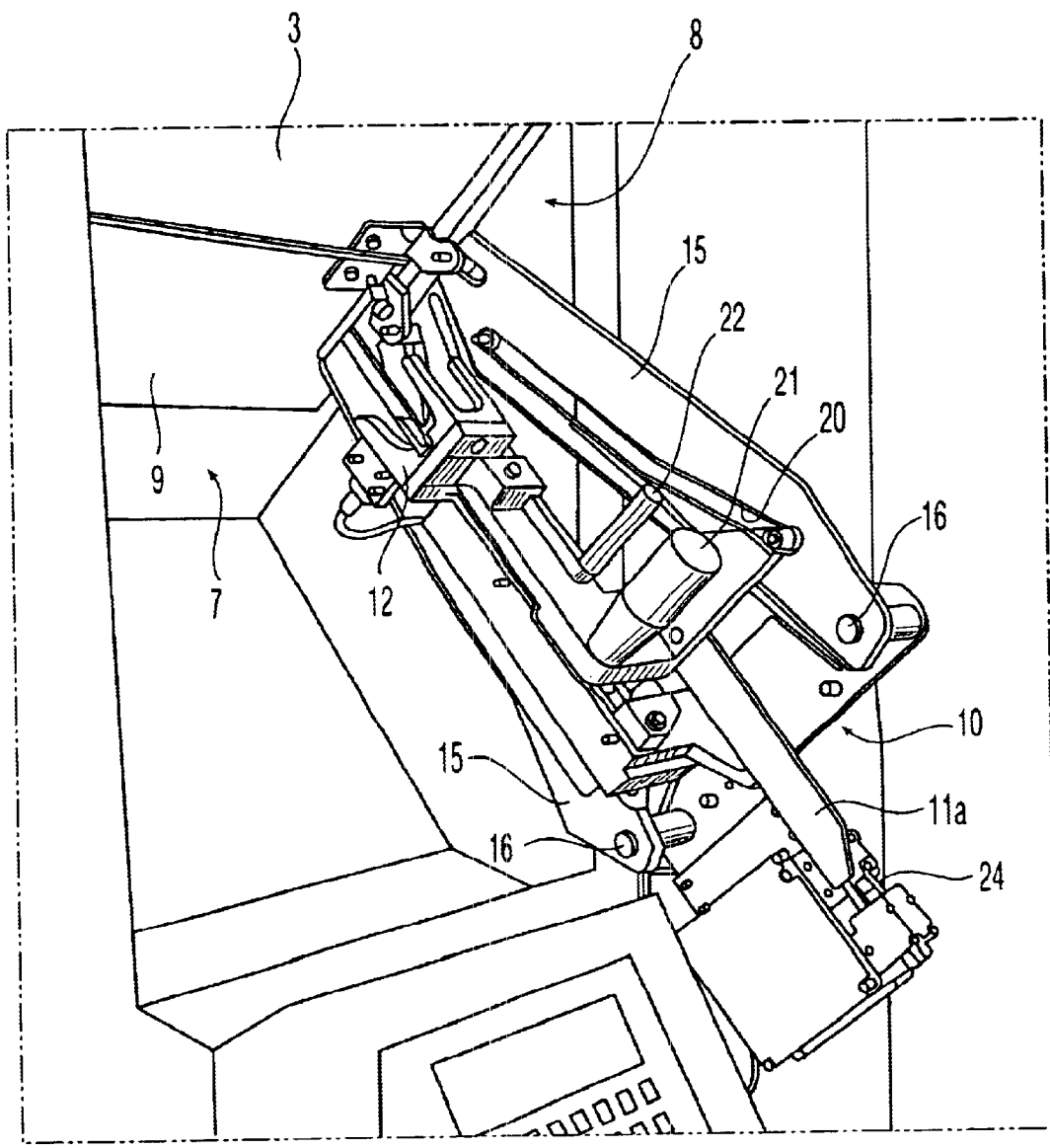
FIG. 1 is a perspective view of an embodiment of the device according to the invention.
Figure 3:
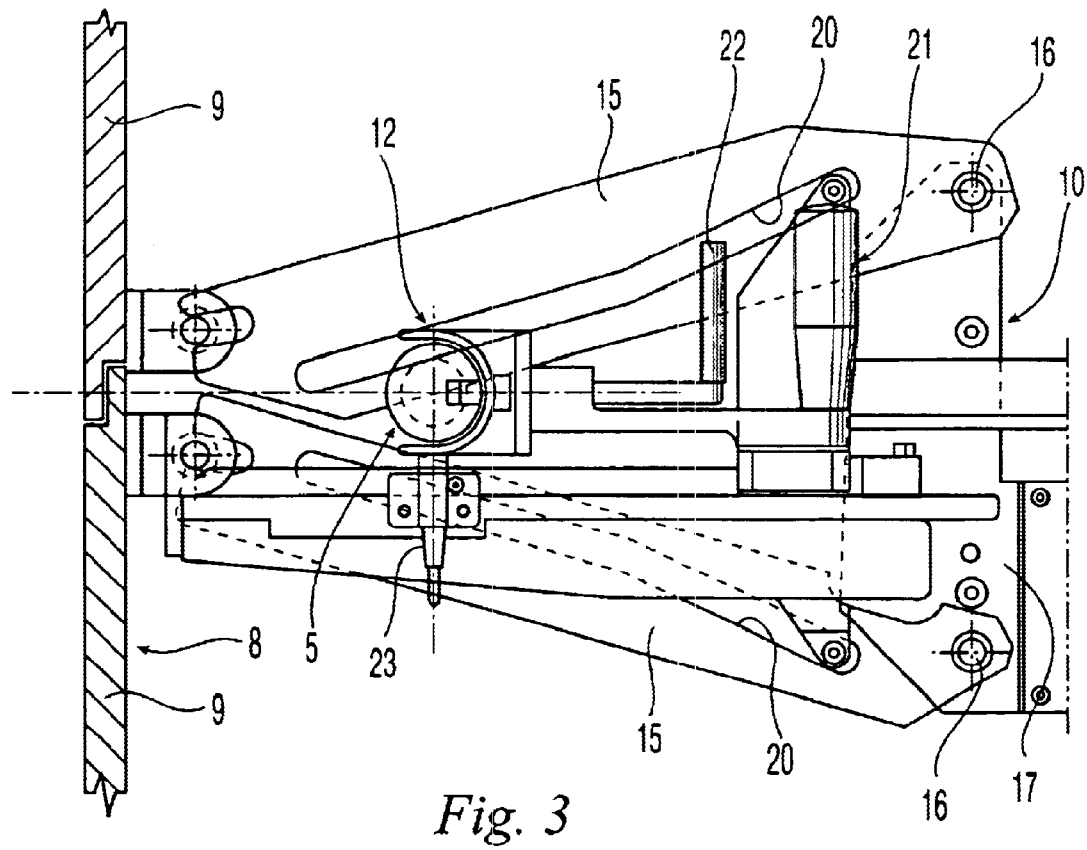
FIGS. 3 and 5 are two side views of the device of FIG. 1, with the slide forming part of the device in the backed-off position and in the advanced position, respectively.
Figure 4:
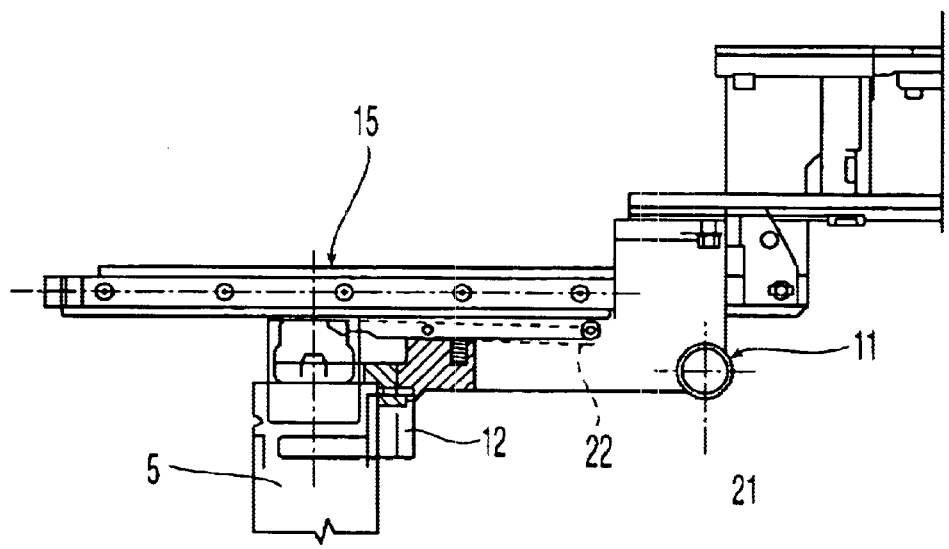
FIG. 4 is a top-plan view corresponding to the advanced position illustrated in FIG. 3.
Figure 5:
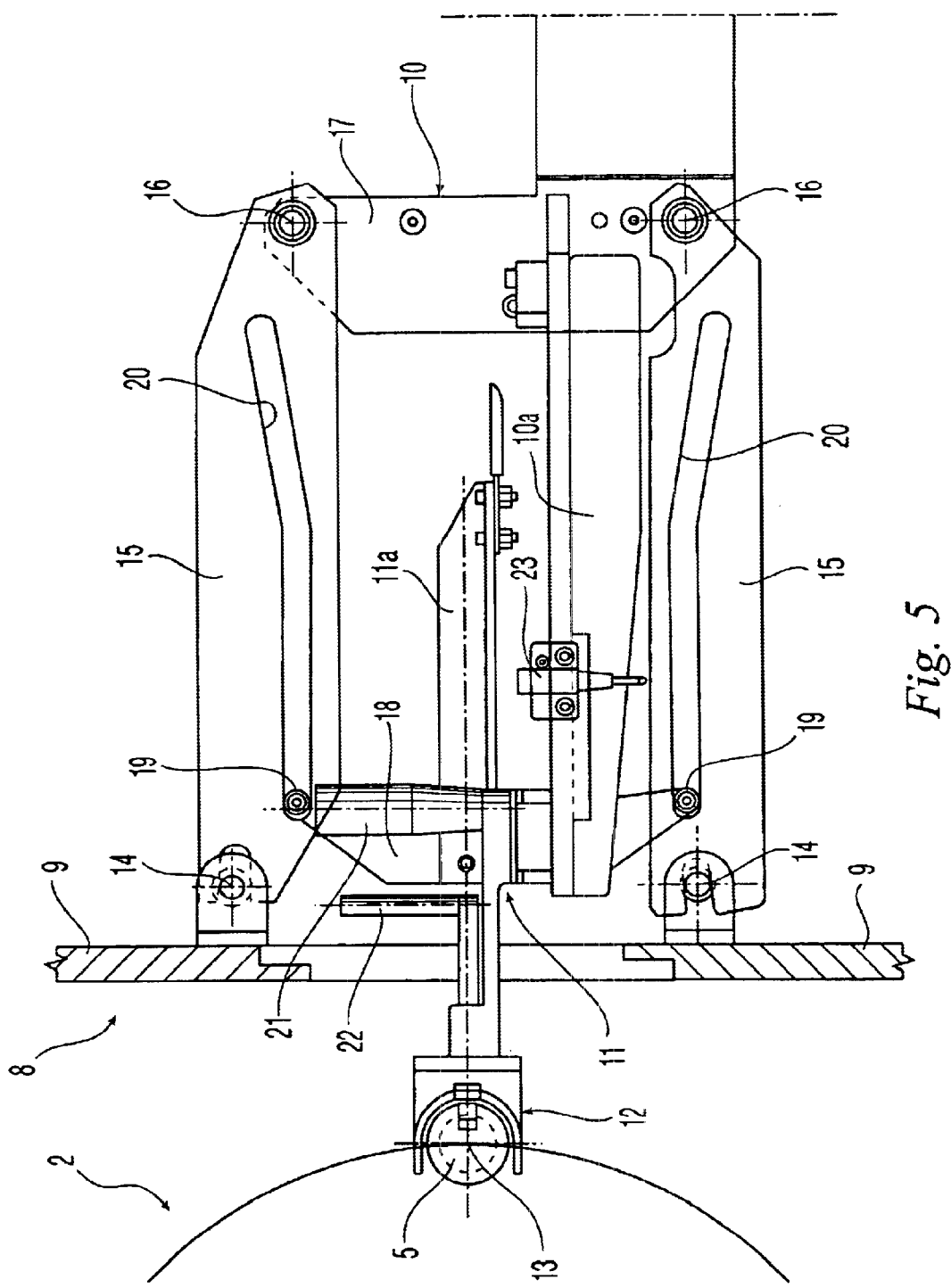

For reasons of operator safety, the area in which the magazine is set is closed by means of a protection wall 7, at which there is provided a door 8, which opens temporarily to allow access to the tool magazine 1 when it is necessary to load a new tool into the magazine 1 or to unload a tool from the magazine 1. In the example illustrated (see FIG. 1), the door 8 comprises two sliding panels 9, which can slide up to one another or away from one another, between a closed position (see FIGS. 1 to 3) and an open position (see FIG. 5).

Outside the protection wall 7 (see FIG. 1), a fixed supporting structure 10 is provided, on which a slide 11 is slidably guided, the said slide carrying a tool-bearing support 12. The slide 11 is mobile between a backed-off position (see FIG. 3), in which the tool-bearing support 12 is set outside the door 8, and an advanced position (see FIG. 5), in which the tool-bearing support 12 is in the vicinity of the tool magazine 1, with the axis 13 of the support 12 set on the peripheral circumference of the wheel 2. The movement of the slide 11 and the movement of the panels 9 of the door 8 are coordinated together by means of a mechanical connection. For this purpose, the two panels 9 of the door 8 are connected in an articulated way about axes 14 at the ends of two arms 15, the opposite ends of which are articulated in 16 to a cross member 17, which forms part of the fixed supporting structure 10. The slide 11 in turn comprises a cross member 18, the opposite ends of which carry pins or rollers 19 engaged in respective shaped slits 20 made in the two arms 15. Following upon this connection, when the operator displaces the slide 11 between its backed-off position and its advanced position, by acting on a grip 21, there is automatically brought about a co-ordinated movement of the two panels 9 of the door between the closed condition and the open condition. Starting from the closed condition (FIG. 3), advance of the slide 11 brings about opening of the two arms 15 and the consequent opening of the door 8, which enables the tool-bearing support 12 to reach the advanced position illustrated in FIG. 5, close to the tool magazine. In the case where it is necessary to deposit a new tool in the magazine, this movement occurs with the tool 5 loaded in the support 12. The tool is kept in position by an elastic gripping device of any type provided in the support 12, the said support being moreover equipped with reference means for correct angular positioning of the tool 5. When the support 12 reaches the advanced position illustrated in FIG. 5, a portion of the body of the tool engages, by snap action, the gripping device represented by the jaws 4 set in a position 3 corresponding to the empty condition of the magazine 1. Upon the next backing-off of the slide 11, the tool 5 remains withheld on the magazine, in so far as the gripping device arranged on the support 12 is released by acting on an actuation lever 22. With backing-off of the slide 11, the support 12 then returns empty outside the wall 7, whilst the door 8 re-closes. Should it be necessary to unload a tool from the magazine, the support 12 is brought, without any tool, into the advanced position illustrated in FIG. 5, until it engages a tool arranged on the magazine. At this point, by acting on the lever 22, the gripping device with which the tool-bearing support 12 is provided is activated in such a way that, with the subsequent backing-off of the slide 11, the tool is unloaded from the magazine, whilst the door 8 re-closes.

The fixed supporting structure 10 is provided with a bracket 10a carrying a proximity sensor 23, which is designed to detect whether the support 12, when it is in its backed-off position, is occupied by a tool. The sensor 23 may also be a tool-code reader (as well as a presence sensor). During loading of a tool on the magazine, this sensor enables automatic passage of a set of information on the type of tool, in such a way that the control automatically pre-disposes the magazine for receiving the tool. During unloading of a tool from the magazine, the same sensor enables, once the tool has been extracted, automatic writing of the residual life of the tool on the chip mounted on the tool-bearing support. Likewise, the slide 11 has a staff 11a, which co-operates with the sensor 24 (FIG. 1), designed for detecting when the slide is in its backed-off position. The signals emitted by the above sensors are sent to the electronic control unit of the machine, which has the function of guaranteeing that the device 6 is driven in a way that is compatible with the operating cycle of the machine and with the operative position of the tool magazine. The sensor 24 is also an electromechanical device driven by the control, which keeps the device blocked in the backed-off position until the machine is in logic and safety conditions for being able to carry out picking-up of a tool from the magazine or depositing of a tool on the magazine.

Of course, without prejudice to the principle of the invention, the details of construction and the embodiments may vary with respect to what is described and illustrated herein purely by way of example, without thereby departing from the scope of the present invention.

What is claimed is:

1. A device for loading and unloading tools into or from the tool magazine of a machine-tool comprising:

a protection wall, which separates the tool magazine from an external protected area;

a door provided on said protection wall for access to the tool magazine;

a tool-bearing slide, having a tool-bearing support designed to receive a tool to be loaded into the magazine or to be unloaded from the magazine, said slide being slidably mounted on a supporting structure outside the protection wall between an advanced position, in which the tool-bearing support is in a position corresponding to the magazine for loading or unloading of a tool into or from the magazine, and a backed-off position, in which the tool-bearing support is in the protected area outside the protection wall for loading or unloading of a tool, in which said door is connected by a mechanical transmission to said slide in such a way that a movement of the slide from its backed-off position to its advanced position, and vice versa, produces a simultaneous movement of the access door from its closed position to its open position, and vice versa.

2. The device according to claim 1, wherein said door has two sliding panels, which can slide away from and up to one another in a direction transverse to the direction of movement of the slide.

3. The device according to claim 1, wherein the two panels are connected in an articulated way to two arms set outside the protection wall which have their opposite ends articulated to said supporting structure so as to be mobile between a first closed position and a second open position corresponding to the closed and open conditions of the door, said slide having engagement members co-operating with guide means arranged on the aforesaid two arms in such a way that a displacement of the slide between the backed-off position and the advanced position causes a corresponding displacement of the panels of the door between the closed condition and the open condition.

4. The device according to claim 3, wherein the supporting structure is provided with sensor means for detecting the backed-off position of the slide.

5. The device according to claim 3, wherein the supporting structure is provided with sensor means for detecting presence of the tool on the tool-bearing support.

6. The device according to claim 3, wherein the guide means consist of a slit made in each of the two arms within which a pin carried by the slide is engaged in a slidable way.

7. The device according to claim 6, wherein the slide includes a cross member carrying, at its ends, the aforesaid pins engaged in the guide slits of the two articulated arms.

8. The device according to claim 1, wherein the slide is provided with a grip.

9. The device according to claim 1, wherein the tool-bearing support is provided with means for gripping and supporting the tool controlled by an actuation lever.

* * * * *